(12) United States Patent
Cote

(10) Patent No.: US 10,195,890 B2
(45) Date of Patent: Feb. 5, 2019

(54) SECURE LENS LAYER

(71) Applicant: Crane Security Technologies, Inc., Nashua, NH (US)

(72) Inventor: Paul F. Cote, Hollis, NH (US)

(73) Assignee: Crane Security Technologies, Inc., Nashua, NH (US)

( * ) Notice: Subject to any disclaimer, the term of this patent is extended or adjusted under 35 U.S.C. 154(b) by 0 days.

(21) Appl. No.: 15/511,316

(22) PCT Filed: Sep. 16, 2015

(86) PCT No.: PCT/US2015/050347
§ 371 (c)(1),
(2) Date: Mar. 15, 2017

(87) PCT Pub. No.: WO2016/044372
PCT Pub. Date: Mar. 24, 2016

(65) Prior Publication Data
US 2017/0246900 A1 Aug. 31, 2017

Related U.S. Application Data

(60) Provisional application No. 62/050,865, filed on Sep. 16, 2014.

(51) Int. Cl.
*B42D 25/342* (2014.01)
*G02B 27/06* (2006.01)
(Continued)

(52) U.S. Cl.
CPC ........... *B42D 25/342* (2014.10); *B41M 3/146* (2013.01); *B42D 25/324* (2014.10); *B42D 25/36* (2014.10);
(Continued)

(58) Field of Classification Search
CPC .... G02B 3/0065; G02B 3/0068; G02B 27/02; G02B 27/06; G02B 27/10; G02B 27/22;
(Continued)

(56) References Cited

U.S. PATENT DOCUMENTS

| 992,151 A | 5/1911 | Berthon |
| 1,824,353 A | 9/1931 | Jensen |

(Continued)

FOREIGN PATENT DOCUMENTS

| AU | 2009278275 | 7/2012 |
| CN | 1126970 | 11/2003 |

(Continued)

OTHER PUBLICATIONS

Article: "Spherical Lenses" (Jan. 18, 2009); pp. 1-12; retrieved from the Internet: URL:http://www.physicsinsights.org/simple_optics_spherical_lenses-1.html.
(Continued)

*Primary Examiner* — Loha Ben

(57) ABSTRACT

A secure lens sheet or layer suitable for use in a micro-optic system, which is made up of a plurality of joined fine lens arrays (e.g., joined fine lenticular and/or joined fine non-cylindrical lens arrays), is provided. Each array has a lens pitch different from adjacent or contiguous arrays and/or is orientated in a direction different from adjacent or contiguous arrays. A micro-optic security device, which utilizes the inventive secure lens sheet and one or more overlying or underlying arrangements of micro-sized image icons (e.g., line data), is also provided. The image icon arrangement(s) and the secure lens layer are configured such that one or more synthetic images are projected by the security device. These projected images may show a number of different optical effects. With such a combination lens layer, some regions could be optically active when the device is tilted in
(Continued)

one direction, some could be active when tilted in the opposite direction, and some areas could be active when the device is tilted in either (or any) direction. The inventive micro-optic security device may be partially embedded in and/or mounted on a surface of a security article (e.g., paper or polymer security document, label, card), or integrated therein.

14 Claims, 2 Drawing Sheets

(51) Int. Cl.
| | |
|---|---|
| G02B 27/10 | (2006.01) |
| G02B 3/00 | (2006.01) |
| B44F 1/10 | (2006.01) |
| G09F 3/00 | (2006.01) |
| B42D 25/405 | (2014.01) |
| B42D 25/36 | (2014.01) |
| B42D 25/324 | (2014.01) |
| B41J 2/00 | (2006.01) |
| B42D 25/30 | (2014.01) |
| B41M 3/14 | (2006.01) |
| B44F 1/08 | (2006.01) |
| G02B 27/02 | (2006.01) |

(52) U.S. Cl.
CPC .............. *B42D 25/405* (2014.10); *B44F 1/10* (2013.01); *G02B 3/0056* (2013.01); *G02B 27/06* (2013.01); *G09F 3/00* (2013.01); *B41J 2/00* (2013.01); *B41M 3/14* (2013.01); *B41M 3/142* (2013.01); *B42D 25/30* (2014.10); *B44F 1/08* (2013.01); *G02B 3/0068* (2013.01); *G02B 27/02* (2013.01); *G02B 27/10* (2013.01)

(58) Field of Classification Search
CPC .............. G02B 27/2214; G02B 3/0056; B42D 25/21–25/24; B42D 25/29; B42D 25/30; B42D 25/36; B42D 25/49; B42D 25/324; B42D 25/342; B42D 25/355; B42D 25/373; B42D 25/378; B42D 15/00; B42D 25/405; B41M 3/14; B41M 3/142; B41M 3/146; B44F 1/08; B44F 1/10; B41J 2/00; B29D 11/00278; B29D 11/00298; B29D 11/00317; B29D 11/00365; G09C 3/00; G09F 3/00
USPC ....... 359/619–623, 454, 455; 283/72–77, 81, 283/85; 358/3.28
See application file for complete search history.

(56) References Cited

U.S. PATENT DOCUMENTS

| | | |
|---|---|---|
| 1,849,036 A | 3/1932 | Ernst |
| 1,942,841 A | 1/1934 | Shimizu |
| 2,268,351 A | 12/1941 | Tanaka |
| 2,355,902 A | 8/1944 | Berg |
| 2,432,896 A | 12/1947 | Hotchner |
| 2,888,855 A | 6/1959 | Tanaka |
| 2,992,103 A | 7/1961 | Land et al. |
| 3,122,853 A | 3/1964 | Koonz et al. |
| 3,241,429 A | 3/1966 | Rice et al. |
| 3,264,164 A | 8/1966 | Jerothe et al. |
| 3,312,006 A | 4/1967 | Rowland |
| 3,357,772 A | 12/1967 | Rowland |
| 3,357,773 A | 12/1967 | Rowland |
| 3,463,581 A | 8/1969 | Clay |
| 3,609,035 A | 9/1971 | Ataka |
| 3,643,361 A | 2/1972 | Eaves |
| 3,704,068 A | 11/1972 | Waly |
| 3,801,183 A | 4/1974 | Sevelin et al. |
| 3,811,213 A | 5/1974 | Eaves |
| 3,887,742 A | 6/1975 | Reinnagel |
| 4,025,673 A | 5/1977 | Reinnagel |
| 4,073,650 A | 2/1978 | Yevick |
| 4,082,426 A | 4/1978 | Brown |
| 4,185,191 A | 1/1980 | Stauffer |
| 4,345,833 A | 8/1982 | Siegmund |
| 4,417,784 A | 11/1983 | Knop et al. |
| 4,498,736 A | 2/1985 | Griffin |
| 4,507,349 A | 3/1985 | Fromson et al. |
| 4,519,632 A | 5/1985 | Parkinson et al. |
| 4,534,398 A | 8/1985 | Crane |
| 4,634,220 A | 1/1987 | Hockert et al. |
| 4,645,301 A | 2/1987 | Orensteen et al. |
| 4,662,651 A | 5/1987 | Mowry, Jr. |
| 4,688,894 A | 8/1987 | Hockert |
| 4,691,993 A | 9/1987 | Porter et al. |
| 4,756,972 A | 7/1988 | Kloosterboer et al. |
| 4,765,656 A | 8/1988 | Becker et al. |
| 4,814,594 A | 3/1989 | Drexler |
| 4,892,336 A | 1/1990 | Kaule et al. |
| 4,892,385 A | 1/1990 | Webster, Jr. et al. |
| 4,920,039 A | 4/1990 | Fotland et al. |
| 4,935,335 A | 6/1990 | Fotland |
| 4,988,126 A | 1/1991 | Heckenkamp et al. |
| 5,044,707 A | 9/1991 | Mallik |
| 5,074,649 A | 12/1991 | Hamanaka |
| 5,085,514 A | 2/1992 | Mallik et al. |
| 5,135,262 A | 8/1992 | Smith et al. |
| 5,142,383 A | 8/1992 | Mallik |
| 5,211,424 A | 5/1993 | Bliss |
| 5,215,864 A | 6/1993 | Laakmann |
| 5,232,764 A | 8/1993 | Oshima |
| 5,254,390 A | 10/1993 | Lu |
| 5,282,650 A | 2/1994 | Smith et al. |
| 5,359,454 A | 10/1994 | Steenblik et al. |
| 5,384,861 A | 1/1995 | Mattson et al. |
| 5,393,099 A | 2/1995 | D'Amato |
| 5,393,590 A | 2/1995 | Caspari |
| 5,433,807 A | 7/1995 | Heckenkamp et al. |
| 5,449,200 A | 9/1995 | Andric et al. |
| 5,460,679 A | 10/1995 | Abdel-Kader |
| 5,461,495 A | 10/1995 | Steenblik et al. |
| 5,464,690 A | 11/1995 | Boswell |
| 5,468,540 A | 11/1995 | Lu |
| 5,479,507 A | 12/1995 | Anderson |
| 5,492,370 A | 2/1996 | Chatwin et al. |
| 5,503,902 A | 4/1996 | Steenblik et al. |
| 5,538,753 A | 7/1996 | Antes et al. |
| 5,543,942 A | 8/1996 | Mizuguchi et al. |
| 5,555,476 A | 9/1996 | Suzuki et al. |
| 5,567,276 A | 10/1996 | Boehm et al. |
| 5,568,313 A | 10/1996 | Steenblik et al. |
| 5,575,507 A | 11/1996 | Yamauchi et al. |
| 5,598,281 A | 1/1997 | Zimmerman et al. |
| 5,623,347 A | 4/1997 | Pizzanelli |
| 5,623,368 A | 4/1997 | Calderini et al. |
| 5,626,969 A | 5/1997 | Joson |
| 5,631,039 A | 5/1997 | Knight et al. |
| 5,639,126 A | 6/1997 | Dames et al. |
| 5,642,226 A | 6/1997 | Rosenthal |
| 5,643,678 A | 7/1997 | Boswell |
| 5,670,003 A | 9/1997 | Boswell |
| 5,670,096 A | 9/1997 | Lu |
| 5,674,580 A | 10/1997 | Boswell |
| 5,688,587 A | 11/1997 | Burchard et al. |
| 5,695,346 A | 12/1997 | Sekiguchi et al. |
| 5,712,731 A | 1/1998 | Drinkwater et al. |
| 5,723,200 A | 3/1998 | Oshima et al. |
| 5,731,064 A | 3/1998 | Süss |
| 5,737,126 A | 4/1998 | Lawandy |
| 5,753,349 A | 5/1998 | Boswell |
| 5,759,683 A | 6/1998 | Boswell |
| 5,763,349 A | 6/1998 | Zandona |
| 5,783,017 A | 7/1998 | Boswell |
| 5,800,907 A | 9/1998 | Yumoto |
| 5,810,957 A | 9/1998 | Boswell |
| 5,812,313 A | 9/1998 | Johansen et al. |

(56) References Cited

U.S. PATENT DOCUMENTS

| | | |
|---|---|---|
| 5,886,798 A | 3/1999 | Staub et al. |
| 5,933,276 A | 8/1999 | Magee |
| 5,949,420 A | 9/1999 | Terlutter |
| 5,995,638 A | 11/1999 | Amidror et al. |
| 6,030,691 A | 2/2000 | Burchard et al. |
| 6,036,230 A | 3/2000 | Farber |
| 6,036,233 A | 3/2000 | Braun et al. |
| 6,060,143 A | 5/2000 | Tompkin et al. |
| 6,084,713 A | 7/2000 | Rosenthal |
| 6,089,614 A | 7/2000 | Howland et al. |
| 6,106,950 A | 8/2000 | Searle et al. |
| 6,176,582 B1 | 1/2001 | Grasnick |
| 6,177,953 B1 | 1/2001 | Vachette et al. |
| 6,179,338 B1 | 1/2001 | Bergmann et al. |
| 6,195,150 B1 | 2/2001 | Silverbrook |
| 6,256,149 B1 | 7/2001 | Rolfe |
| 6,256,150 B1 | 7/2001 | Rosenthal |
| 6,283,509 B1 | 9/2001 | Braun et al. |
| 6,288,842 B1 | 9/2001 | Florczak et al. |
| 6,301,363 B1 | 10/2001 | Mowry, Jr. |
| 6,302,989 B1 | 10/2001 | Kaule |
| 6,328,342 B1 | 12/2001 | Belousov et al. |
| 6,329,040 B1 | 12/2001 | Oshima et al. |
| 6,345,104 B1 | 2/2002 | Rhoads |
| 6,348,999 B1 | 2/2002 | Summersgill et al. |
| 6,350,036 B1 | 2/2002 | Hannington et al. |
| 6,369,947 B1 | 4/2002 | Staub et al. |
| 6,373,965 B1 | 4/2002 | Liang |
| 6,381,071 B1 | 4/2002 | Dona et al. |
| 6,396,636 B2* | 5/2002 | Sawaki ............... G02B 3/005 348/E9.024 |
| 6,404,555 B1 | 6/2002 | Nishikawa |
| 6,414,794 B1 | 7/2002 | Rosenthal |
| 6,424,467 B1 | 7/2002 | Goggins |
| 6,433,844 B2 | 8/2002 | Li |
| 6,450,540 B1 | 9/2002 | Kim |
| 6,467,810 B2 | 10/2002 | Taylor et al. |
| 6,473,238 B1 | 10/2002 | Daniell |
| 6,500,526 B1 | 12/2002 | Hannington |
| 6,542,646 B1 | 4/2003 | Bar-Yona |
| 6,558,009 B2 | 5/2003 | Hannington et al. |
| 6,587,276 B2 | 7/2003 | Daniell |
| 6,616,803 B1 | 9/2003 | Isherwood et al. |
| 6,641,270 B2 | 11/2003 | Hannington et al. |
| 6,671,095 B2 | 12/2003 | Summersgill et al. |
| 6,712,399 B1 | 3/2004 | Drinkwater et al. |
| 6,721,101 B2 | 4/2004 | Daniell |
| 6,724,536 B2 | 4/2004 | Magee |
| 6,726,858 B2 | 4/2004 | Andrews |
| 6,751,024 B1 | 6/2004 | Rosenthal |
| 6,761,377 B2 | 7/2004 | Taylor et al. |
| 6,795,250 B2 | 9/2004 | Johnson et al. |
| 6,803,088 B2 | 10/2004 | Kaminsky et al. |
| 6,819,775 B2 | 11/2004 | Amidror et al. |
| 6,833,960 B1 | 12/2004 | Scarbrough et al. |
| 6,856,462 B1 | 2/2005 | Scarbrough et al. |
| 6,870,681 B1 | 3/2005 | Magee |
| 6,900,944 B2 | 5/2005 | Tomczyk |
| 6,935,756 B2 | 8/2005 | Sewall et al. |
| 7,030,997 B2 | 4/2006 | Neureuther et al. |
| 7,058,202 B2 | 6/2006 | Amidror |
| 7,068,434 B2 | 6/2006 | Florczak et al. |
| 7,114,750 B1 | 10/2006 | Alasia et al. |
| 7,194,105 B2 | 3/2007 | Hersch et al. |
| 7,246,824 B2 | 7/2007 | Hudson |
| 7,254,265 B2 | 8/2007 | Naske et al. |
| 7,255,911 B2 | 8/2007 | Lutz et al. |
| 7,288,320 B2 | 10/2007 | Steenblik et al. |
| 7,333,268 B2 | 2/2008 | Steenblik et al. |
| 7,336,422 B2 | 2/2008 | Dunn et al. |
| 7,359,120 B1* | 4/2008 | Raymond ........... G02B 27/2214 359/619 |
| 7,372,631 B2 | 5/2008 | Ozawa |
| 7,389,939 B2 | 6/2008 | Jones et al. |
| 7,422,781 B2 | 9/2008 | Gosselin |
| 7,457,038 B2 | 11/2008 | Dolgoff |
| 7,457,039 B2 | 11/2008 | Raymond et al. |
| 7,468,842 B2 | 12/2008 | Steenblik et al. |
| 7,504,147 B2 | 3/2009 | Hannington |
| 7,545,567 B2 | 6/2009 | Tomczyk |
| 7,609,450 B2* | 10/2009 | Niemuth ............. G02B 3/0043 359/619 |
| 7,630,954 B2 | 12/2009 | Adamczyk et al. |
| 7,686,187 B2 | 3/2010 | Pottish et al. |
| 7,712,623 B2 | 5/2010 | Wentz et al. |
| 7,719,733 B2 | 5/2010 | Schilling et al. |
| 7,738,175 B2 | 6/2010 | Steenblik et al. |
| 7,751,608 B2 | 7/2010 | Hersch et al. |
| 7,762,591 B2 | 7/2010 | Schilling et al. |
| 7,763,179 B2 | 7/2010 | Levy et al. |
| 7,812,935 B2 | 10/2010 | Cowburn et al. |
| 7,830,627 B2 | 11/2010 | Commander et al. |
| 7,849,993 B2 | 12/2010 | Finkenzeller et al. |
| 8,027,093 B2 | 9/2011 | Commander et al. |
| 8,057,980 B2 | 11/2011 | Dunn et al. |
| 8,149,511 B2 | 4/2012 | Kaule et al. |
| 8,284,492 B2 | 10/2012 | Crane et al. |
| 8,528,941 B2 | 9/2013 | Dörfler et al. |
| 8,557,369 B2 | 10/2013 | Hoffmüller et al. |
| 8,693,101 B2* | 4/2014 | Tomczyk ......... B29D 11/00278 359/618 |
| 8,739,711 B2* | 6/2014 | Cote ................... G02B 3/0006 112/402 |
| 8,867,134 B2 | 10/2014 | Steenblik et al. |
| 8,908,276 B2 | 12/2014 | Holmes |
| 9,019,613 B2* | 4/2015 | Raymond ............ B42D 25/324 359/619 |
| 9,132,690 B2* | 9/2015 | Raymond ............. B42D 15/00 |
| 9,592,700 B2* | 3/2017 | Raymond ........... B42D 25/324 |
| 9,701,150 B2* | 7/2017 | Raymond ............. B42D 15/00 |
| 9,802,437 B2* | 10/2017 | Holmes ............... B42D 25/355 |
| 2001/0048968 A1 | 12/2001 | Cox et al. |
| 2002/0014967 A1 | 2/2002 | Crane et al. |
| 2002/0114078 A1 | 8/2002 | Halle et al. |
| 2002/0185857 A1 | 12/2002 | Taylor et al. |
| 2003/0031861 A1 | 2/2003 | Reiter et al. |
| 2003/0112523 A1 | 6/2003 | Daniell |
| 2003/0157211 A1 | 8/2003 | Tsunetomo et al. |
| 2003/0179364 A1 | 9/2003 | Steenblik et al. |
| 2003/0183695 A1 | 10/2003 | Labrec et al. |
| 2003/0228014 A1 | 12/2003 | Alasia et al. |
| 2003/0232179 A1 | 12/2003 | Steenblik et al. |
| 2003/0234294 A1 | 12/2003 | Uchihiro et al. |
| 2004/0020086 A1 | 2/2004 | Hudson |
| 2004/0022967 A1 | 2/2004 | Lutz et al. |
| 2004/0100707 A1 | 5/2004 | Kay et al. |
| 2004/0140665 A1 | 7/2004 | Scarbrough et al. |
| 2004/0209049 A1 | 10/2004 | Bak |
| 2005/0094274 A1 | 5/2005 | Souparis |
| 2005/0104364 A1 | 5/2005 | Keller et al. |
| 2005/0161501 A1 | 7/2005 | Giering et al. |
| 2005/0180020 A1 | 8/2005 | Steenblik et al. |
| 2005/0247794 A1 | 11/2005 | Jones et al. |
| 2006/0003295 A1 | 1/2006 | Hersch et al. |
| 2006/0017979 A1 | 1/2006 | Goggins |
| 2006/0018021 A1 | 1/2006 | Tomkins et al. |
| 2006/0227427 A1 | 10/2006 | Dolgoff |
| 2007/0058260 A1 | 3/2007 | Steenblik et al. |
| 2007/0092680 A1 | 4/2007 | Chaffins et al. |
| 2007/0183045 A1 | 8/2007 | Schilling et al. |
| 2007/0183047 A1 | 8/2007 | Phillips et al. |
| 2007/0273143 A1 | 11/2007 | Crane et al. |
| 2007/0284546 A1 | 12/2007 | Ryzi et al. |
| 2007/0291362 A1 | 12/2007 | Hill et al. |
| 2008/0037131 A1 | 2/2008 | Steenblik et al. |
| 2008/0130018 A1 | 6/2008 | Steenblik et al. |
| 2008/0160226 A1 | 7/2008 | Kaule et al. |
| 2008/0182084 A1 | 7/2008 | Tompkin et al. |
| 2009/0008923 A1 | 1/2009 | Kaule et al. |
| 2009/0310470 A1 | 12/2009 | Yrjonen |
| 2009/0315316 A1 | 12/2009 | Staub et al. |
| 2010/0018644 A1 | 1/2010 | Sacks et al. |
| 2010/0068459 A1 | 3/2010 | Wang et al. |
| 2010/0109317 A1 | 5/2010 | Huffmuller et al. |

(56) References Cited

U.S. PATENT DOCUMENTS

| | | |
|---|---|---|
| 2010/0177094 A1 | 7/2010 | Kaule et al. |
| 2010/0182221 A1 | 7/2010 | Kaule et al. |
| 2010/0194532 A1 | 8/2010 | Kaule |
| 2010/0208036 A1 | 8/2010 | Kaule |
| 2010/0308571 A1 | 12/2010 | Steenblik et al. |
| 2010/0328922 A1 | 12/2010 | Peters et al. |
| 2011/0017498 A1 | 1/2011 | Lauffer et al. |
| 2011/0019283 A1 | 1/2011 | Steenblik et al. |
| 2012/0019607 A1 | 1/2012 | Dunn et al. |
| 2012/0033305 A1 | 2/2012 | Moon et al. |
| 2012/0098249 A1 | 4/2012 | Rahm et al. |
| 2012/0268819 A1 | 10/2012 | Commander et al. |
| 2013/0003354 A1 | 1/2013 | Meis et al. |
| 2013/0010048 A1 | 1/2013 | Dunn et al. |
| 2013/0044362 A1 | 2/2013 | Commander et al. |
| 2013/0154250 A1 | 6/2013 | Dunn et al. |
| 2014/0174306 A1 | 6/2014 | Wening et al. |
| 2014/0353959 A1 | 12/2014 | Lochbihler |
| 2014/0367957 A1 | 12/2014 | Jordan |

FOREIGN PATENT DOCUMENTS

| | | |
|---|---|---|
| CN | 101563640 A | 10/2009 |
| CN | 102712204 A | 10/2012 |
| DE | 19804858 | 8/1999 |
| DE | 19932240 | 1/2001 |
| DE | 10100692 | 8/2004 |
| EP | 0090130 | 10/1983 |
| EP | 0092691 | 11/1983 |
| EP | 0118222 | 9/1984 |
| EP | 0203752 | 12/1986 |
| EP | 0253089 | 1/1988 |
| EP | 0318717 | 6/1989 |
| EP | 0415230 | 3/1991 |
| EP | 0319157 | 7/1992 |
| EP | 0930174 | 7/1999 |
| EP | 0997750 | 5/2000 |
| EP | 1356952 | 10/2003 |
| EP | 1002640 | 5/2004 |
| EP | 1354925 | 4/2006 |
| EP | 1659449 | 5/2006 |
| EP | 1876028 | 1/2008 |
| EP | 2335937 | 6/2011 |
| EP | 2162294 | 3/2012 |
| FR | 2803939 | 7/2001 |
| GB | 1095286 | 12/1967 |
| GB | 2362493 | 11/2001 |
| GB | 2490780 | 11/2012 |
| JP | 41-004953 | 3/1941 |
| JP | 46-022600 | 6/1971 |
| JP | 04-234699 | 8/1992 |
| JP | 10-035083 | 2/1998 |
| JP | 10-039108 | 2/1998 |
| JP | 11-501590 | 2/1999 |
| JP | 11-189000 | 7/1999 |
| JP | 2000-256994 | 9/2000 |
| JP | 2001-055000 | 2/2001 |
| JP | 2001-516899 | 10/2001 |
| JP | 2001-324949 | 11/2001 |
| JP | 2003-039583 | 2/2003 |
| JP | 2003-165289 | 6/2003 |
| JP | 2003-528349 | 9/2003 |
| JP | 2004-262144 | 9/2004 |
| JP | 2009-274293 | 11/2009 |
| KR | 10-0194536 | 6/1999 |
| KR | 2002170350000 | 3/2001 |
| KR | 2003119050000 | 5/2003 |
| KR | 1005443000000 | 1/2006 |
| KR | 1005613210000 | 3/2006 |
| RU | 2111125 | 5/1998 |
| RU | 2245566 | 1/2005 |
| TW | 575740 | 2/2004 |
| WO | WO 1992/008998 | 5/1992 |
| WO | WO 1993/024332 | 12/1993 |
| WO | WO 1996/035971 | 11/1996 |
| WO | WO 1997/019820 | 6/1997 |
| WO | WO 1997/044769 | 11/1997 |
| WO | WO 1998/013211 | 4/1998 |
| WO | WO 1998/015418 | 4/1998 |
| WO | WO 1998/026373 | 6/1998 |
| WO | WO 1999/014725 | 3/1999 |
| WO | WO 1999/023513 | 5/1999 |
| WO | WO 1999/026793 | 6/1999 |
| WO | WO 1999/066356 | 12/1999 |
| WO | WO 2001/007268 | 2/2001 |
| WO | WO 2001/011591 | 2/2001 |
| WO | WO 2001/039138 | 5/2001 |
| WO | WO 2001/053113 | 7/2001 |
| WO | WO 2001/063341 | 8/2001 |
| WO | WO 2001/071410 | 9/2001 |
| WO | WO 2002/040291 | 5/2002 |
| WO | WO 2002/043012 | 5/2002 |
| WO | WO 2003/005075 | 1/2003 |
| WO | WO 2003/007276 | 1/2003 |
| WO | WO 2003/022598 | 3/2003 |
| WO | WO 2003/053713 | 7/2003 |
| WO | WO 2003/061980 | 7/2003 |
| WO | WO 2003/061983 | 7/2003 |
| WO | WO 2003/082598 | 10/2003 |
| WO | WO 2003/098188 | 11/2003 |
| WO | WO 2004/022355 | 3/2004 |
| WO | WO 2004/036507 | 4/2004 |
| WO | WO 2004/087430 | 10/2004 |
| WO | WO 2005/106601 | 11/2005 |
| WO | WO 2006/029744 | 3/2006 |
| WO | WO 2007/076952 | 7/2007 |
| WO | WO 2007/133613 | 11/2007 |
| WO | WO 2008/000530 | 12/2008 |
| WO | WO 2009/000527 | 12/2008 |
| WO | WO 2009/000528 | 12/2008 |
| WO | WO 2009/000529 | 12/2008 |
| WO | WO 2009/121784 | 10/2009 |
| WO | WO 2010/015383 | 2/2010 |
| WO | WO 2010/136339 | 12/2010 |
| WO | WO 2011/015384 | 2/2011 |
| WO | WO 2011/051669 | 5/2011 |
| WO | WO 2011/107793 | 9/2011 |
| WO | WO 2011/122943 | 10/2011 |
| WO | WO 2012/027779 | 3/2012 |
| WO | WO 2012/103441 | 8/2012 |
| WO | WO 2013/028534 | 2/2013 |

OTHER PUBLICATIONS

Drinkwater, K. John, et al., "Development and applications of Diffractive Optical Security Devices for Banknotes and High Value Documents", Optical Security and Counterfeit Deterrence Techniques III, 2000, pp. 66-77, SPIE vol. 3973, San Jose, CA.

Fletcher, D.A., et al., "Near-field infrared imaging with a microfabricated solid immersion lens", Applied Physics Letters, Oct. 2, 2000, pp. 2109-2111, vol. 77, No. 14.

Gale, M. T., et al., Chapter 6—Replication, Micro Optics: Elements, Systems and Applications, 1997, pp. 153-177.

Hardwick, Bruce and Ghioghiu Ana, "Guardian Substrate as an Optical Medium for Security Devices", Optical Security and Counterfeit Deterrence Techniques III, 2000, pp. 176-179, SPIE vol. 3973, San Jose, CA.

Hutley, M.C., et al., "The Moiré Magnifier", Pure Appl. Opt. 3, 1994, pp. 133-142, IOP Publishing Ltd., UK.

Hutley, M.C., "Integral Photography, Superlenses and the Moiré Magnifier", European Optical Society, 1993, pp. 72-75, vol. 2, UK.

Hutley, M., et al., "Microlens Arrays", Physics World, Jul. 1991, pp. 27-32.

Kamal, H., et al., "Properties of Moiré Magnifiers", Opt. Eng., Nov. 1998, pp. 3007-3014, vol. 37, No. 11.

Leech, Patrick W., et al., Printing via hot embossing of optically variable images in thermoplastic acrylic lacquer, Microelectronic Engineering, 2006, pp. 1961-1965, vol. 83, No. 10, Elsevier Publishers BV, Amsterdam, NL.

Lippmann, G., "Photgraphie—Épreuves Réversibles, Photographies Intégrals", Académie des Sciences, 1908, pp. 446-451, vol. 146, Paris.

(56) References Cited

OTHER PUBLICATIONS

Liu, S., et al., "Artistic Effect and Application of Moiré Patterns in Security Holograms", Applied Optics, Aug. 1995, pp. 4700-4702, vol. 34, No. 22.
Phillips, Roger W., et al., Security Enhancement of Holograms with Interference Coatings, Optical Security and Counterfeit Deterrence Techniques III, 2000, pp. 304-316, SPIE vol. 3973, San Jose, CA.
Steenblik, Richard A., et al., UNISON Micro-optic Security Film, Optical Security and Counterfeit Deterrence Techniques V, 2004, pp. 321-327, SPIE vol. 5310, San Jose, CA.
Van Renesse, Rudolf L., Optical Document Security, 1994, Artech House Inc., Norwood, MA.
Van Renesse, Rudolf L., Optical Document Security, 1998, 2nd edition, pp. 232-235, 240-241 and 320-321, Artech House Inc., Norwood, MA (ISBN 0-89006-982-4).
Van Renesse, Rudolf L., Optical Document Security, 2005, 3rd edition, pp. 62-169, Artech House Inc., Norwood, MA (ISBN 1-58053-258-6).
Wolpert, Gary R., Design and development of an effective optical variable device based security system incorporating additional synergistic security technologies, Optical Security and Counterfeit Deterrence Techniques III, 2000, pp. 55-61, SPIE vol. 3973, San Jose, CA.
Zhang, X., et al., "Concealed Holographic Coding for Security Applications by Using a Moiré Technique", Applied Optics, Nov. 1997, pp. 8096-8097, vol. 36, No. 31.
Communication from a foreign patent office in a counterpart foreign application, National Intellectual Property Administration, P.R. China, "First Office Action," Application No. CN 201580061853.9, Sep. 10, 2018, 20 pages.

\* cited by examiner

SECURE LENS LAYER

CROSS-REFERENCE TO RELATED APPLICATION

This application claims benefit of and priority to U.S. Provisional Patent Application No. 62/050,865, filed on Sep. 16, 2014, which is incorporated herein by reference in its entirety.

TECHNICAL FIELD

This invention relates to a secure lens layer, and more particularly to a micro-optic system that employs such a secure lens layer.

BACKGROUND

Optical materials have long been recognized as valued additions to secure articles (e.g., documents, labels, cards). These materials allow for a variety of self-authenticating optical effects thus rendering the secure article more resistant to counterfeiting.

By way of example, U.S. Pat. No. 7,333,268 to Steenblik et al. depicts a security device in the form of a micro-optic film material or structure that employs a regular two-dimensional array of lenses to enlarge micro-images. The film material or structure comprises: (a) one or more optical spacers; (b) an array of image icons positioned on one surface of the optical spacer; and (c) an array of microlenses positioned on an opposing surface of the optical spacer. The images projected by this film structure show a number of visual effects including orthoparallactic movement.

A common form of microlens enhanced surface that may be used with such film structures is a lenticular lens sheet. The lenticular lens sheet comprises a substrate with a top surface having a side-by-side array of substantially parallel refractive optical ridges (or substantially parallel reflective optical valleys) and with a bottom surface that is generally flat.

As is well known to those skilled in the art, a most important factor when designing or selecting a micro-optic security device for the security protection of an article is the security device's resistance to simulation by attempts at all levels of sophistication. Resistance to simulation is best done with methods that remain simple and obvious enough for the public to continue to be the main line of defense. The use of simple lens arrays such as packed hexagonal, square spherical and parallel cylindrical (lenticular) arrays may invite attempts to simulate the complex optical effects using commercially available lens sheets. Lenticular lens sheets are readily available up to about 200 lenses per inch (LPI) or 79 lenses per centimeter (LPCM), and are greater than or equal to approximately 125 microns in total thickness. While the thickness of these commercial lenticular lens sheets is greater than the thickness of lens layers used in a majority of micro-optic security devices for article security, the resolution of these 200 LPI lenticular lens sheets may be sufficient to satisfy the observer. It has therefore been difficult in practice to provide a highly counterfeit-resistance micro-optic security device that utilizes a lenticular lens array.

SUMMARY OF THE INVENTION

The present invention addresses this problem by providing a secure lens sheet or layer suitable for use in a micro-optic system, which is made up of a plurality of joined fine lens arrays (e.g., joined fine cylindrical (lenticular) and/or joined fine non-cylindrical lens arrays), each array having a lens pitch (LPI or LPCM) different from that of adjacent or contiguous arrays and/or is orientated in a direction different from that of adjacent or contiguous arrays.

The term "joined", as used herein, is intended to mean that each array is either in contact with adjacent or contiguous arrays, or separated by a small gap (e.g., less than or equal to about 1 millimeter (mm), preferably less than about 5 microns (µ)), while the term "fine" is intended to mean a lens array having a lens pitch (LPI or LPCM) of greater than or equal to about 700 LPI (275 LPCM).

In an exemplary embodiment, the lens arrays are cylindrical (lenticular) lens arrays where each lenticular lens array contains lenses arranged in a generally parallel and/or side-by-side orientation, and is substantially co-planar with the other array(s). The lenticular lenses in each array can be straight, curved, or include multiple bends (i.e., serpentine lenticular lens arrays). Each array may adopt any size or shape (e.g., square, rectangular, triangular, hexagonal), and is joined to one or more other arrays along one or more edges thereof.

In several such contemplated embodiments, the inventive lens sheet is an elongate lens sheet that has a length and a width and is made up of an arrangement of:

square and/or rectangle-shaped lenticular lens arrays that extend fully or partially across its width and along its length, each lens array orientated in a direction different from adjacent or contiguous arrays and having the same or different lens pitch, wherein one or more such arrays optionally have another lenticular lens array wholly or partially disposed therein (e.g., a smaller hexagon-shaped lenticular lens array disposed within a larger square or rectangle-shaped lenticular lens array);

triangle-shaped lenticular lens arrays including, but not limited to, acute isosceles triangle-shaped lenticular lens arrays, and pairs of right isosceles triangle-shaped lenticular lens arrays that extend fully across its width and along its length, with each pair forming a square, with one lens array orientated in a direction perpendicular to the other lens array in the pair; and combinations thereof.

The above-referenced lenticular lens arrays may be used alone or in combination with other focusing element arrays including, but not limited to, non-cylindrical lens arrays. The non-cylindrical lens arrays may include lenses having circular, oval, or polygonal base geometries, and may be arranged in regular or random, one- or two-dimensional arrays. By way of example, an acute isosceles triangle-shaped cylindrical lens array may be positioned so as to at least partially intrude into a regular or random, two-dimensional array of lenses having a polygonal (e.g., hexagonal) base geometry. In one exemplary embodiment, a non-cylindrical lens array is disposed adjacent or contiguous to or disposed within a lenticular or cylindrical lens array. In another embodiment, the cylindrical lens array is disposed within the non-cylindrical array. As used herein, the term "disposed within" refers to an array which is either partially or fully contained within another array. For example, at least a part of a boundary or edge of one array may be contained within the boundary of another array.

In a further exemplary embodiment, the lens arrays are non-cylindrical (e.g., spherical or aspherical) lens arrays, where each non-cylindrical lens array contains lenses arranged generally as described above, and is substantially co-planar with the other array(s). Each array may adopt any size or shape, and is joined to one or more other arrays along one or more edges thereof. The non-cylindrical lens arrays may be disposed adjacent or contiguous to or may be contained partially or fully within one or more other arrays.

As noted above, the lens arrays used in the inventive lens sheet may have the same or different lens pitches (LPI or LPCM). In one exemplary embodiment, at least one lens array is a regular lens array that has a fixed lens pitch that ranges from about 2000 to about 5000 LPI, preferably from about 3000 to about 4000 LPI. The term "regular", as used herein, refers to a lens array with a uniform or fixed lens pitch. In another exemplary embodiment, at least one lens array is an irregular lens array having changing lens pitches (e.g., lens pitches which range from about 3000 to about 3500 LPI and from about 3500 to about 4000 LPI), which allows for different optical effects such as different speeds of movement. The term "irregular", as used herein, refers to a lens array with a non-uniform or changing lens pitch. The lens pitch may change either gradually or in one or more discrete steps thereby forming zones or areas of different lens pitches within the lens array. A changing lens pitch may be a uniform pitch change or a non-uniform pitch change along the length of the cylindrical or non-cylindrical lens (e.g., fan-shaped or bending).

The thickness of the inventive lens sheet is preferably less than about 30 microns, more preferably less than about 25 microns, and most preferably less than about 20 microns. As will be readily appreciated by those skilled in the art, the counterfeit-resistance of such sheets increases as the lens pitch increases and as the lens layer thickness decreases. This is due to the increased difficulty in fabrication and in achieving the required level of printing resolution and registration between the lenses and the underlying or overlying printing.

The present invention also provides a micro-optic security device, which comprises the secure lens sheet or layer described above and one or more overlying or underlying arrangements of micro-sized image icons (e.g., line data). The image icon arrangement(s) and the secure lens layer are configured such that one or more synthetic images are projected by the security device. These projected images may show a number of different optical effects. With such a combination lens layer, some regions could be active (i.e., project a synthetic image(s)) when the device is tilted in one direction, some could be active when tilted in the opposite axis, and some areas could be active when the device is tilted in either (or any) direction. The total thickness of the inventive security device may range from less than or equal to about 3 millimeters (mm) including (but not limited to) thicknesses ranging from less than about 50 microns, less than about 45 microns, from about 10 to about 40 microns, and ranges present therebetween.

The present invention further provides a secure article (e.g., paper or polymer security document, label, card) having opposing surfaces and comprising at least one micro-optic security device, as described above, partially embedded in and/or mounted on a surface of the secure article, or integrated therein.

Other features and advantages of the invention will be apparent to those of ordinary skill in the art from the following detailed description and accompanying drawings. Unless otherwise defined, all technical and scientific terms used herein have the same meaning as commonly understood by one of ordinary skill in the art to which this invention belongs. All publications, patent applications, patents and other references mentioned herein are incorporated by reference in their entirety. In case of conflict, the present specification, including definitions, will control. In addition, the materials, methods/processes, and examples are illustrative only and not intended to be limiting.

BRIEF DESCRIPTION OF THE DRAWINGS

The present disclosure may be better understood with reference to the following drawings. Matching reference numerals designate corresponding parts throughout the drawings, and components in the drawings are not necessarily to scale, emphasis instead being placed upon clearly illustrating the principles of the present disclosure. While exemplary embodiments are disclosed in connection with the drawings, there is no intent to limit the present disclosure to the embodiment or embodiments disclosed herein. On the contrary, the intent is to cover all alternatives, modifications and equivalents.

Particular features of the disclosed invention are illustrated by reference to the accompanying drawings in which.

DETAILED DESCRIPTION OF THE INVENTION

Figure 1:
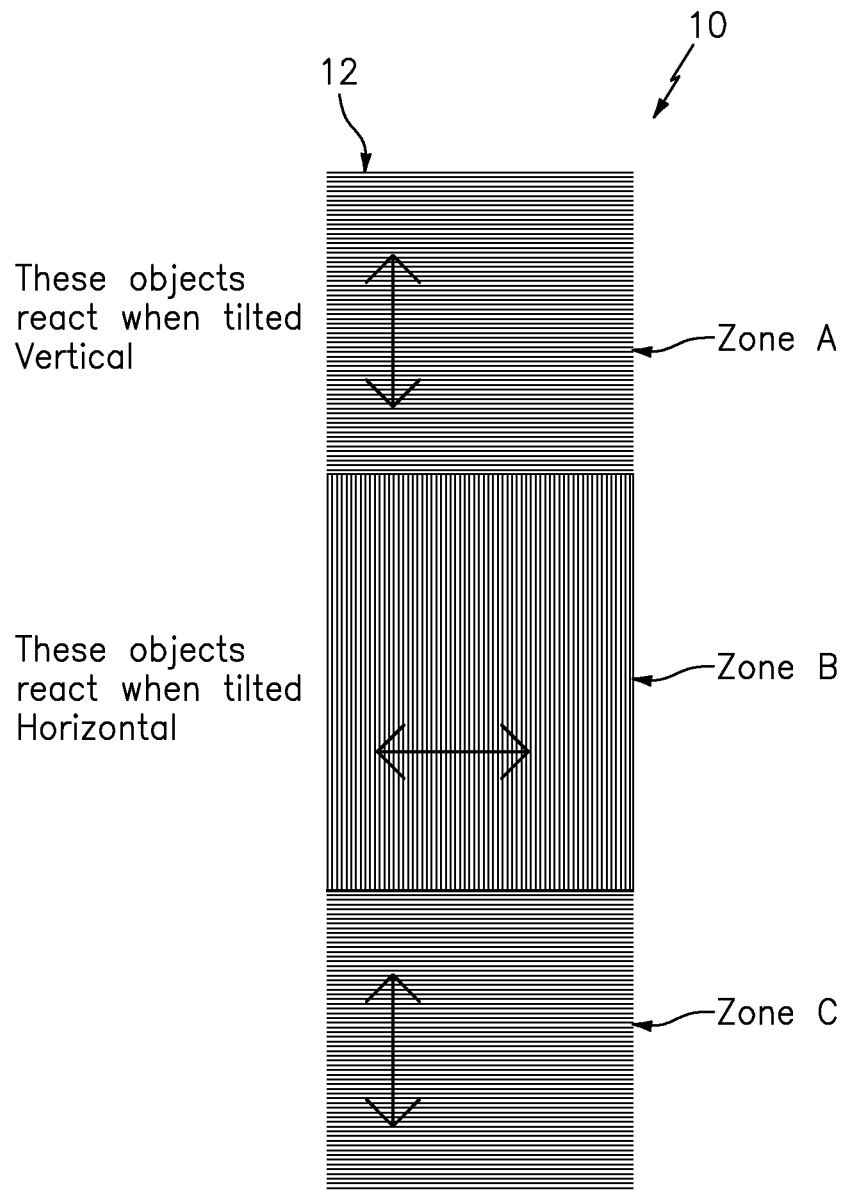
FIG. 1 is a top planar view of an embodiment of the micro-optic security device of the present invention, where the lens layer is made up of square and rectangle-shaped lenticular lens arrays arranged in zones that extend across the width and along the length of the lens layer.

By way of the present invention, both simple and intricate combinations of multiple lens arrays or formats are used on the same security device or tool. These combinations function as a major deterrent to simulating the authenticating effects generally provided by commercially available lenticular films. As noted above, with such a novel combination lens layer, some regions or zones can be active when the device is tilted in one direction, some can be active when the device is tilted in an opposite direction, while other regions or zones can be active when the device is tilted in either (or any) direction.

The secure lens sheet or layer of the present invention is made up of a plurality of joined fine lens arrays, each array being different in some way from adjacent or contiguous arrays. These differences can, for example, be orientation, lens pitch, or combinations thereof. Contemplated lens array embodiments include those made up of fine cylindrical (lenticular) lens arrays, fine non-cylindrical (e.g., spherical or aspherical) lens arrays, or a combination of both fine lenticular and fine non-cylindrical lens arrays. As noted above, it is also contemplated that individual lens arrays may have regular or irregular lens pitches. For example, a lens array may have a fixed lens pitch or it may have particular areas or zones within the array which have different pitches and/or the lens pitch may change gradually across all or part of the array. Each lens array of the plurality of joined fine lens arrays, which form the secure lens sheet or layer of the present invention, are disposed adjacent or contiguous to, or are disposed at least partially within another lens array. In one such embodiment, at least one lens array is fully disposed within another lens array, with all of its boundaries located within the boundaries of the other lens array.

Contemplated fine lenses include, but are not limited to, cylindrical and non-cylindrical refractive lenses, reflective lenses, hybrid refractive/reflective lenses, and combinations thereof.

Embedment of these lens arrays serves to improve their resistance to optically degrading external effects. In one such embodiment, the refractive index from an outer surface of the inventive lens sheet or layer to refracting interfaces is varied between a first and a second refractive index, the first refractive index being substantially or measurably different than the second refractive index. The phrase "substantially or measurably different", as used herein, means a difference in refractive index that is at least 0.04 refractive index units. The lenses can be positioned with the curved surface facing the observer and/or inverted with the curvature facing away from the observer.

The embedding material may be transparent, translucent, tinted, or pigmented and may provide additional functionality for security and authentication purposes, including support of automated currency authentication, verification, tracking, counting and detection systems, that rely on optical effects, electrical conductivity or electrical capacitance, magnetic field detection. Suitable materials can include adhesives, gels, glues, lacquers, liquids, molded polymers, and polymers or other materials containing organic or metallic dispersions.

The inventive lens sheet or layer is used with one or more overlying or underlying arrangements of micro-sized image icons or lines (e.g., line data or line patterns of specific width, angle, pitch) to form the micro-optic security device of the present invention. Here, groups of associated lens arrays and micro-sized image icons ("imaging groups") collectively form, magnify and project one or more synthetically magnified images as the device is tilted, or as the viewing angle changes. The lens arrays and the image icons (e.g., line data in the form of patterned line shaped objects) are both rotated to cause optical effects at different angles of integration to be observed. These imaging groups may project the same or different images with the same or different visual effects. Simultaneously projected images or so-called "super icons" may appear upon viewing one portion of the security device, while fixed projected images and/or sequentially projected images that change from one form to another may appear upon viewing other portions of the device. In any one location, the projected images may appear to lie on a spatial plane above or below a surface of the device, or may appear to move or turn on and off (e.g., moving bars, rotating wheels, flicker images, etc.).

As described in U.S. Pat. No. 7,333,268 to Steenblik et al., the magnitude of the magnification or synthetic magnification of the images as well as the above-noted visual effects are dependent upon the degree of "skew" between the arrangements (e.g., arrays) of focusing elements (e.g., lenses) and image icons or line data, the relative scales of the two arrays, and the f-number of the focusing elements or lenses, with the f-number being defined as the quotient obtained by dividing the focal length of the lens (f) by the effective maximum diameter of the lens (D).

One or more optical spacer layers may optionally be included between the lens arrays and micro-sized image icons or lines of the inventive micro-optic security device. This layer(s) may be formed using one or more essentially transparent or translucent polymers including, but not limited to, polycarbonate, polyester, polyethylene, polyethylene napthalate, polyethylene terephthalate, polypropylene, polyvinylidene chloride, and the like. In an exemplary embodiment, the optional optical spacer layer(s) is formed using polyester or polyethylene terephthalate.

The micro-sized image icons or lines may be printed (i.e., formed from a printing method such as ink jet, laserjet, etc.) directly on the lens layer or on the optical spacer layer. In a preferred embodiment, the image icons are raised or recessed relative to a surface of the lens or spacer layer. More specifically, the image icons are formed as either voids or recesses on or in the lens or spacer layer, or raised relative to the layer.

The secure lens layer and arrangement(s) of micro-sized image icons or lines of the inventive micro-optic security device may be formed from a variety of materials such as substantially transparent or clear, colored or colorless polymers such as acrylics, acrylated polyesters, acrylated urethanes, epoxies, polycarbonates, polypropylenes, polyesters, urethanes, and the like, using a multiplicity of methods that are known in the art of micro-optic and microstructure replication, including extrusion (e.g., extrusion embossing, soft embossing), radiation cured casting, and injection molding, reaction injection molding, and reaction casting.

An exemplary sheet or web processing method of manufacture for the micro-optic security device utilizes tools that separately incorporate the lens and image icon microstructures. In this exemplary method, both the lens tools and the icon tools are originated using photomasks and photoresist methods. The image icons are formed as voids in a radiation cured liquid polymer (e.g., acrylated urethane) that is cast against a base film (i.e., an optical spacer), such as 75 gauge adhesion-promoted polyethylene terephthalate (PET) film, then the joined fine lens arrays are formed from the radiation cured polymer on the opposite face of the base film in correct alignment or skew with respect to the image icons, then the image icon voids are filled with a submicron particle pigmented coloring material by gravure-like doctor blading against the film surface, and the fill solidified by suitable means (e.g., solvent removal, radiation curing, or chemical reaction).

Exemplary embodiments of the inventive micro-optic security device will now be described in conjunction with the drawings. A first exemplary embodiment is shown in FIG. 1, with the inventive micro-optic security device marked by reference numeral 10. Device 10 comprises elongate lens sheet or layer 12 and an underlying arrangement of micro-sized image icons or line data (not shown). Lens layer 12 is made up of square and rectangle-shaped lenticular lens arrays arranged in zones (Zones A-C) that extend fully across the width and along the length of lens layer 12. The lenses in each lens array or zone are orientated in a direction perpendicular to lenses in adjacent or contiguous zones. The lens pitch changes along the length of lens layer 12 in that the lens pitch of Zones A and C is greater than the lens pitch of Zone B.

As shown by the arrows in FIG. 1, Zone A and Zone C are optically active in that they project a synthetic image(s) that moves in the same direction when device 10 is tilted vertically. Zone B is also active in that it projects a synthetic image(s) that moves in a different direction, as shown by the arrow in Zone B, and at a reduced speed of movement due to the lower lens pitch in this zone, when the device 10 is tilted horizontally.

Figure 2:
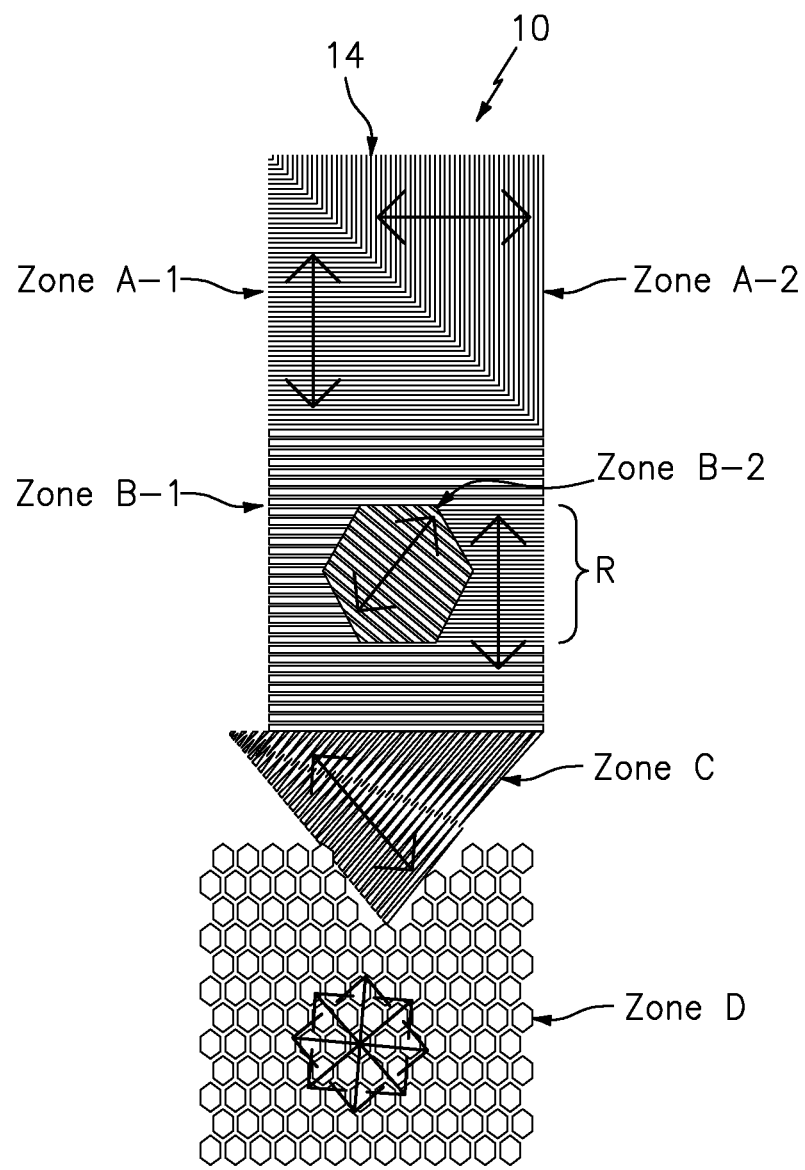
FIG. 2 is a top planar view of another embodiment of the inventive micro-optic security device where the lens layer is made up of a more intricate combination of lens arrays including both cylindrical and non-cylindrical lens arrays.

A second exemplary embodiment of micro-optic security device 10 is shown in FIG. 2. In this embodiment, device 10 comprises elongate lens sheet or layer 14 and an underlying arrangement of micro-sized image icons or line data (not shown). Lens layer 14 constitutes a more intricate combination of lens arrays including both cylindrical and non-cylindrical lens arrays, which are arranged in zones (Zones A-1, A-2, B-1, B-2, C, D). The lens-free areas shown in FIG. 2 may form part of a desired effect from underlying regions. For example, these areas may appear as a partial (e.g., 30%) tone of the underlying icon color without animation.

Zone A-1 and Zone A-2 constitute a pair of right isosceles triangle-shaped lenticular lens arrays, with the lenses in one array orientated in a direction perpendicular to the lenses in the other array in the pair. Together these arrays form a square that extends across the width and along the length of layer 14. Zone A-1 is active in that it projects a synthetic image(s) that moves in the direction shown by the arrow in Zone A-1 when the device 10 is tilted vertically, while Zone A-2 is active in that it projects a synthetic image(s) that moves in the direction shown by the arrow in Zone A-2 when the device 10 is tilted horizontally. Where both arrays have the same or similar lens pitch, the speed of movement of the synthetic images in these arrays would be the same or similar.

The right isosceles triangle-shaped lenticular lens array of Zone A-1 is joined to a rectangle-shaped lenticular lens array in Zone B-1, which has a smaller hexagon-shaped and obtusely angled lenticular lens array disposed therein in Zone B-2. The lenses in Zone B-1 are orientated in a direction parallel to the lenses in Zone A-1. Moreover, Zone B-1 has a lens pitch that differs from Zone A-1 and which increases in mid-region R, which is located to the right of Zone B-2. Zone B-1 is active in that it projects a synthetic image(s) that moves in the direction shown by the arrow in Zone B-1 when the device 10 is tilted vertically, with this movement increasing in speed in mid-region R due to the increased lens pitch in this region. Zone B-2 is active when the device 10 is tilted from top-right to lower-left, or vice-versa. The speed of movement of synthetic images projected by Zone B-2 is similar to the speed of movement of images projected by regions above and below region R in Zone B-1.

The rectangle-shaped lenticular lens array in Zone B-1 is joined to an acute isosceles triangle-shaped lens array in Zone C, which extends further across the width of device 10. The lenses in Zone C are orientated at an acute angle relative to the lenses in Zone B-1. Zone C has a lens pitch that increases in the direction of decreasing lens length. Zone C is active when the device 10 is tilted from top-left to lower-right, or vice-versa, with speed of movement optionally increasing as the pitch decreases.

The acute isosceles triangle-shaped lens array in Zone C intrudes partially into a regular, two-dimensional array of lenses having an hexagonal base geometry in Zone D. This array extends further across the width of device 10. As shown by the arrows in Zone D, this array is active in all directions of tilt. This array can be a regular (fixed) or an irregular (changing) array in angle and/or pitch.

As noted above, the micro-optic security device of the present invention may be partially embedded in and/or mounted on a surface of a secure article, or integrated therein. Secure articles include, but are not limited to, paper and polymer security documents, labels and cards.

While various embodiments of the present invention have been described above, it should be understood that they have been presented by way of example only, and not limitation. Thus, the breadth and scope of the present invention should not be limited by any of the exemplary embodiments.

We claim:

1. A secure lens sheet or layer suitable for use in a micro-optic system, which comprises a plurality of joined fine lens arrays, wherein each array is in contact with an adjacent or contiguous array, or separated by a gap less than or equal to 1 mm, and wherein the arrays have a lens pitch of greater than or equal to 275 lenses per centimeter,
   wherein each array has a lens pitch different from that of an adjacent or contiguous array.

2. The secure lens sheet or layer of claim 1, wherein the plurality of joined fine lens arrays are substantially co-planar lens arrays and/or wherein each array is orientated in a direction different from that of an adjacent or contiguous array.

3. The secure lens sheet or layer of claim 2, wherein the plurality of joined fine lens arrays are selected from a group of joined fine lenticular lens arrays, joined fine non-cylindrical lens arrays, joined fine spherical lens arrays, joined fine aspherical lens arrays and combinations of joined fine lenticular lens arrays and joined fine non-cylindrical lens arrays.

4. The secure lens sheet or layer of claim 1, wherein the plurality of joined fine lens arrays are lenticular lens arrays, each lens array containing lenses arranged in a generally parallel, side-by-side orientation.

5. The secure lens sheet or layer of claim 1, wherein a thickness of the sheet or layer is less than about 30 microns.

6. The secure lens sheet or layer of claim 5, wherein the thickness of the sheet or layer is less than about 25 microns.

7. The secure lens sheet or layer of claim 5, wherein the thickness of the sheet or layer is less than about 20 microns.

8. A micro-optic security device, which comprises the secure lens sheet or layer of claim 1 and one or more overlying or underlying arrangements of micro-sized image icons, wherein the one or more image icon arrangements and the secure lens sheet or layer are configured such that one or more synthetic images are projected by the security device.

9. A secure article having opposing surfaces and comprising at least one micro-optic security device of claim 8, partially embedded in and/or mounted on a surface of the secure article, or integrated therein.

10. A secure lens sheet or layer suitable for use in a micro-optic system, which comprises a plurality of joined fine lens arrays,
   wherein each array has a lens pitch different from that of an adjacent or contiguous array and/or
   wherein each array is orientated in a direction different from that of an adjacent or contiguous array,
   wherein the secure lens sheet or layer is an elongate lens sheet that has a length and a width and is made up of an arrangement of:
   square and/or rectangle-shaped lenticular lens arrays that extend fully across its width and along its length, each lens array orientated in a direction different from that of adjacent or contiguous arrays and having the same or different lens pitch, wherein one or more lens arrays optionally have another lenticular lens array wholly or partially disposed therein;
   triangle-shaped lenticular lens arrays selected from a group of acute isosceles triangle-shaped lenticular lens arrays, and pairs of right isosceles triangle-shaped lenticular lens arrays that extend fully across its width and along its length, with each pair forming a square, with one lens array orientated in a direction perpendicular to the other lens array in the pair; and
   combinations thereof.

11. A secure lens sheet or layer, suitable for use in a micro-optic system, which comprises a plurality of joined fine lens arrays,
   wherein each array has a lens pitch different from that of an adjacent or contiguous array and/or wherein each array is orientated in a direction different from that of an adjacent or contiguous array, wherein at least one lens array is a regular lens array that has a fixed lens pitch that ranges from about 2000 to about 5000 lenses per inch.

12. The secure lens sheet or layer of claim 11, wherein the fixed lens pitch ranges from about 3000 to about 4000 lenses per inch.

13. A secure lens sheet or layer, suitable for use in a micro-optic system, which comprises a plurality of joined fine lens arrays, wherein each array has a lens pitch different from that of an adjacent or contiguous array and/or wherein each array is orientated in a direction different from that of an adjacent or contiguous array, wherein at least one lens array is an irregular lens array having more than one lens pitch, wherein, optionally, the irregular lens array has two lens pitches, a first lens pitch ranging from about 3000 to about 3500 lenses per inch and a second lens pitch ranging from 3500 to about 4000 lenses per inch.

14. A secure lens sheet or layer suitable for use in a micro-optic system, which comprises a plurality of joined fine lens arrays, wherein each array has a lens pitch different from that of an adjacent or contiguous array and/or wherein each array is orientated in a direction different from that of an adjacent or contiguous array, wherein the lens arrays are partially or totally embedded with a material to improve resistance of the lens arrays to optically degrading external effects.

* * * * *